Oct. 11, 1966 W. M. RUPP 3,278,830
BRIDGE-TYPE PARAMETRIC FREQUENCY MULTIPLIER
Filed Sept. 5, 1962
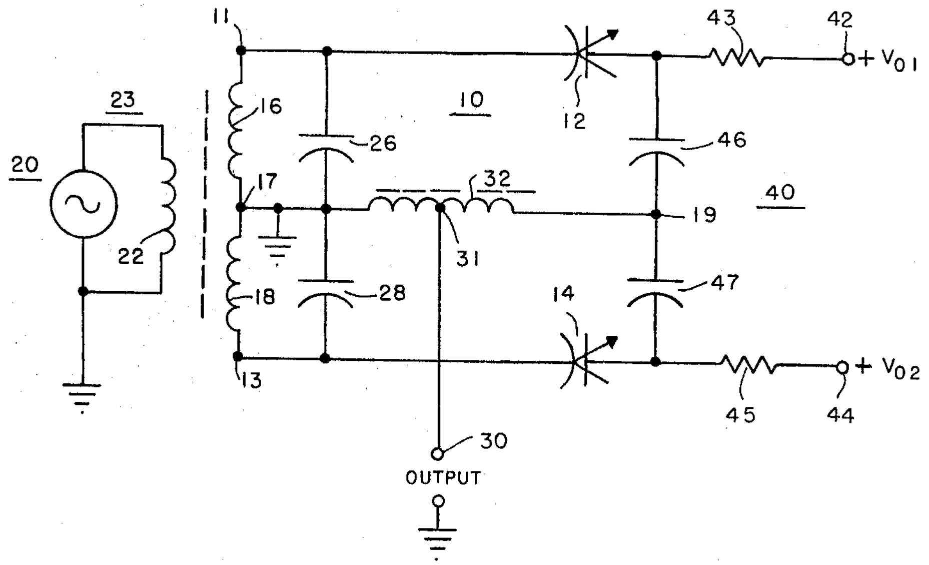
INVENTOR,
WERNER M. RUPP
BY Harry M. Saragovitz
ATTORNEY

United States Patent Office 3,278,830

Patented Oct. 11, 1966

3,278,830

BRIDGE-TYPE PARAMETRIC FREQUENCY MULTIPLIER

Werner M. Rupp, Elberon, N.J., assignor to the United States of America as represented by the Secretary of the Army Filed Sept. 5, 1962, Ser. No. 221,636
3 Claims. (Cl. 321—69)

The invention described herein may be manufactured and used by or for the Government for governmental purposes, without the payment of any royalty thereon.

This invention relates to frequency multipliers and particularly to frequency multipliers of the bridge type. More particularly, this invention relates to frequency multipliers using the parametric effect.

Frequency multipliers are well known and certain of the existing frequency multipliers use bridge configurations and techniques. However, none of these frequency multipliers use the parametric effect.

The parametric effect, itself, is also well known and can be used to generate harmonics at a relatively high efficiency as well as to provide amplification. However, the existing frequency multipliers of the parametric type use only one diode and require at least two tuned circuits, or filter networks, to isolate the input from the output and to function properly.

It is therefore an object of this invention to provide an improved frequency generator.

It is a further object of this invention to provide a frequency generator having a comparatively higher conversion efficiency.

It is a further object of this invention to provide an improved frequency generator that does not require any filter network.

It is a further object of this invention to provide a frequency generator with simplified circuitry and improved isolation between the input and output circuits.

These and other objects are accomplished by connecting a pair of variable reactance diodes, biased in the reverse direction, as two of the arms of the bridge and connecting the center-tapped coils of the push-pull output of a parametric pump source as the other two arms of the bridge. Condensers are connected in parallel with these last two arms. For proper operation, the polarity of the two diodes has to be such that either the cathodes or the anodes oppose each other. The source of parametric excitation is, then, across one of the diagonals of the bridge and serves as the input to the bridge. The output of the bridge can be taken from a coil connected across the other diagonal of the bridge; between the center tap of the coils and the common connection of the two variable reactance diodes. The output coil, effectively in parallel with the two variable reactance diodes, is made resonant at the desired harmonic of the input frequency.

This invention will be better understood and other and further objects of this invention will become apparent from the following specification and the drawing, which shows a typical bridge-connected, parametric, frequency multiplier.

In the drawing, the bridge 10 comprises the variable-capacitive reactance arms 12 and 14 and the inductive arms 16 and 18, with the two capacitances 26 and 28 in parallel, connected across the diagonal terminals 11–13. The blocking capacitors 46 and 47 are in series with, but are of negligible impedance compared with, the impedances of the variable-reactance diodes 12 and 14 in this alternating current bridge. The midpoints 17–19 of the two pairs of arms provide the other diagonal terminals of the bridge.

In the drawing, the cathodes of the diodes 12 and 14 are connected to the terminals 11 and 13 respectively. However, it is understood that the operation of the circuit is the same if the anodes are connected to the terminals 11 and 13.

The input to the bridge, across the diagonals 11–13, is by inductive coupling of the alternating current energy from the pump 20, through the primary coil 22 of the transformer 23, to the center-tapped secondary coils 16 and 18. These secondaries apply the input across the diagonals 11–13 of the bridge. The capacitors 26 and 28 are chosen such that, together with the inductances of the coils 16 and 18, they form a resonant circuit tuned to the input frequency, of the pump 20, and provide a low impedance for the output frequency resonant circuits. The output of the bridge is taken from the inductive coil 32 which is connected across the diagonals 17–19. One end of the coil 32 is grounded at 17. The output terminal 30, is connected to a tap 31 in the coil 32 for impedance matching purposes.

The two direct volages $V_{01}$ and $V_{02}$, connected between ground and the terminals 42 and 44 respectively, bias the two diodes 12 and 14 in their reverse direction and give them appropriate operating point values.

The two high impedance resistors 43 and 45 isolate the two direct voltage sources from the rest of the circuit with respect to alternating voltages. Radio frequency chokes could be used instead of the resistors 43 and 45.

The bridge can be perfectly balanced by changing either $V_{01}$ or $V_{02}$. If the components themselves ideally balance the bridge, only one voltage source need be used for both $V_{01}$ and $V_{02}$.

In operation, the pump 20 supplies an alternating voltage across the diagonals 11–13 of the bridge 10 through the transformer 23. This applies the pump voltage across the series-connected variable capacity diodes 12 and 14 through the low impedance blocking capacitors 46 and 47.

The alternating voltage changes the instantaneous capacity of the two varactor diodes, periodically and in inverse phase relationships. The resulting unbalance of the bridge builds up alternating voltages, having a harmonic relationship to the pump frequency, across the diagonals 17–19. This produces alternating current signals in the coil 32 at frequencies that are multiples or harmonics of the pump frequency.

The actual, harmonic, output frequency is that of the resonant circuit formed by the coil 32 and the mean capacities of the variable capacity diodes 12 and 14, which are, effectively, connected in parallel with the coil 32. The capacitors 26 and 28 have negligible impedance for the higher harmonic frequencies of the output circuit, and any currents through the center-tapped secondary coils 16 and 18 will oppose and, for the most part, neutralize each other.

The resonant frequency of the coil 32 is also influenced by its own distributed capacity; and may be altered by additional inductances or capacitors that may be added in series or in parallel with the coil 32 in a well known manner.

If the bridge is perfectly balanced, no alternating voltage at the input, pump frequency will appear across the diagonal terminals 17–19 of the output circuit, and no alternating voltage at the output, harmonic frequency will appear across the input diagonal terminals 11–13. Perfect isolation between input and output is achieved in this case.

The condensers 26 and 28 may be omitted if a tuned circuit is provided at the input side 22 of the transformer 23 or if the inductance of 16 and 18 is high enough to be resonate at the input pump frequency with only the capacity of the diodes 12 and 14.

For a pump frequency of 1 mc., and a harmonic output frequency of 2 mc., typical values of the components of the bridge are: diodes 12 and 14—PC–117–47, manufactured by the Pacific Semiconductor Corporation; inductance 32—40 microhenries; inductance 22—1.5 microhenries; inductances 16 and 18—6 microhenries each; capacitances 26 and 28—4700 micromicrofarads each; capacitances 46 and 47—0.1 microfarad each; resistances 43 and 45—0.5 megohm each; and direct voltages $V_{01}$ and $V_{02}$—4 v. each. The transformer 23 and coil 32 use Ferramic core material Q1.

Having thus described my invention, what is claimed is:

1. A bridge-connected, parametric, frequency multiplier comprising a first pair of diagonally opposing terminals; a transformer having a primary winding, and a center-tapped secondary winding connected across said first pair of diagonally opposing terminals; a pump frequency generator connected to the primary winding of said transformer; first and second variable capacity diodes; a first and second source of voltage with respect to ground; first and second condensers connected in series between the terminals of one polarity of said first and second variable capacity diodes, the terminals of the other polarity of said variable capacity diodes connecting the series combination of said variable capacity diodes and said condensers across said first pair of diagonally opposing terminals; a first and second resistor, each connecting one of said sources of voltage to one of the junctions between said condensers and said variable capacity diodes; and an output circuit connected across a second pair of diagonally opposing terminals formed by the common connection of said condensers, and the center tap of said transformer secondary winding.

2. A bridge-connected parametric frequency multiplier comprising a first pair of diagonally opposing terminals; a transformer having a primary winding, and a center-tapped secondary winding connected across said first pair of diagonally opposing terminals; a pump frequency generator connected to the primary winding of said transformer, first and second variable capacity diodes connected in series back-to-back across said first pair of diagonally opposing terminals; means, connected to each of said diodes, for biasing said diodes in the reverse direction; an output circuit connected across a second pair of diagonally opposing terminals between the common connection of said diodes and the center tap of said transformer secondary; and a condenser connected across each of the halves of said center-tapped secondary winding of said transformer to form a resonant circuit tuned to the frequency of said pump frequency generator.

3. In a bridge-connected parametric frequency multiplier as in claim 2 said output circuit comprising a coil having an inductive reactance to form a resonant circuit, in combination with the mean capacitance of said variable capacity diodes, at a harmonic frequency of said pump frequency generator; a first output terminal connected to an impedance matching tap in said coil; and a second output terminal connected to the center tap of said center-tapped winding.

References Cited by the Examiner

UNITED STATES PATENTS

| | | | |
|---|---|---|---|
| 2,969,497 | 1/1961 | Zen-Iti Kiyasu et al. | 321—69 |
| 3,023,378 | 2/1962 | Fuller | 332—52 |
| 3,084,335 | 4/1963 | Kosonocky et al. | 340—173.2 |

FOREIGN PATENTS

| | | |
|---|---|---|
| 914,848 | 1/1963 | Great Britain. |

OTHER REFERENCES

"Circuit Designers Improve Practical Applications of Solid-State Devices," by S. Weber, M. F. Wolff, and L. O. Shergalis, published by Electronics, vol. 35, No. 9 (March 2, 1962), pp. 20–21.

JOHN F. COUCH, *Primary Examiner.*

LLOYD McCOLLUM, *Examiner.*

G. J. BUDOCK, G. GOLDBERG, *Assistant Examiners.*